United States Patent [19]
Kotani et al.

[11] Patent Number: 4,529,488
[45] Date of Patent: Jul. 16, 1985

[54] PROCESS FOR DEPOSITING SALTS

[75] Inventors: Yasuo Kotani, Hirakata; Tokio Hashimoto, Kusatsu, both of Japan

[73] Assignee: Nippon Gohsei Kagaku Kogyo Kabushiki Kaisha, Osaka, Japan

[21] Appl. No.: 393,502

[22] Filed: Jun. 29, 1982

[51] Int. Cl.³ ............................ C25B 3/00; C25B 1/00; C25B 9/00; C25B 11/04

[52] U.S. Cl. .................................. 204/62; 204/72; 204/86; 204/90; 204/91; 204/92; 204/93; 204/274; 204/DIG. 6; 204/280; 204/290 R

[58] Field of Search ................ 204/186, 59 R, 60, 39, 204/274, 62, 72, 86–87, 90–93, DIG. 6; 23/295 R, 300, 301, 302 R, 302 A, 302 T, 303, 304, 305 R, 305 A, 305 F, 305 RE; 260/707, DIG. 35

[56] References Cited
U.S. PATENT DOCUMENTS
3,977,009 8/1976 Ohtsuka et al. .................. 346/74 R OTHER PUBLICATIONS
Kozlovskii, CA 58: 8468 c.
Polukarov et al., Chemical Abstracts, vol. 92, Abstract 188127y (1980).
Kozlovskii, Chemical Abstracts, vol. 75, Abstract 41304u (1971).

Primary Examiner—Donald R. Valentine
Attorney, Agent, or Firm—Armstrong, Nikaido, Marmelstein & Kubovcik

[57] ABSTRACT

A process for depositing a salt by applying an electric current or voltage to at least one pair of electrodes placed in a supersaturated aqueous solution or supercooled molten liquid of an inorganic or organic salt, whereby the supersaturation or supercooling can be broken or prevented and the crystallization or solidification of the salt can be efficiently made. The process of the invention is advantageously utilized in an air-conditioning system.

7 Claims, 8 Drawing Figures

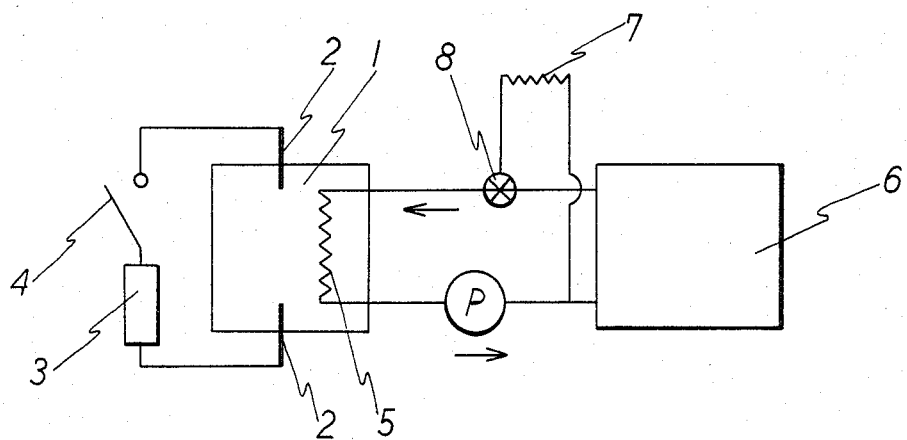
FIG. 1
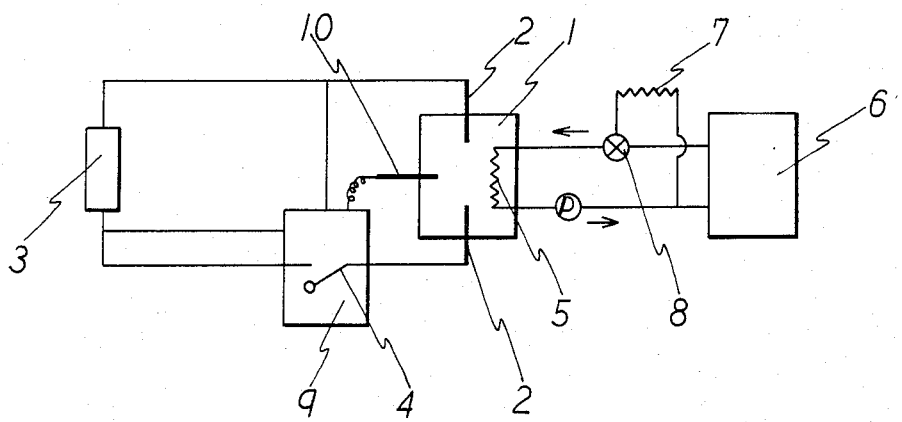
FIG. 2
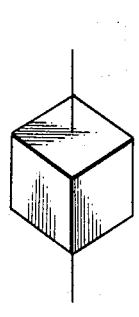 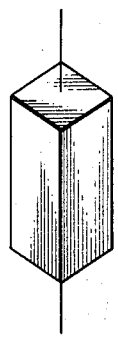 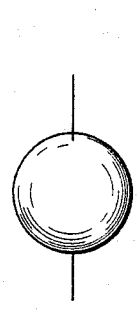 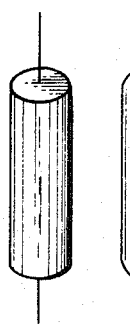 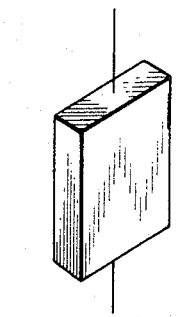
FIG. 3   FIG. 4   FIG. 5   FIG. 6  FIG. 7  FIG. 8

PROCESS FOR DEPOSITING SALTS

BACKGROUND OF THE INVENTION

The present invention relates to a process for depositing salts from supersaturated aqueous solutions of salts or supercooled molten liquids of salts.

A technique of depositing salts as crystals from aqueous solutions or molten liquids thereof has been utilized in various fields.

In general, the solubility of salts in water depends on the kind of the salts and temperature, and the solubility of many salts increases with temperature. When the saturated solution of the salts is cooled, the excess amounts of salts deposit. This phenomenon is frequently utilized as recrystallization to obtain pure salts from aqueous solutions of salts.

When some salts are heated, they melt at a defined temperature to become molten liquids. To the contrary, when molten liquids of the salts are cooled, they solidify at a defined temperature and often release a latent heat. As an application of this phenomenon, there is known a method in which a salt is melted by solar heat or waste heat from factories, and latent heat released at solidification of the salt is utilized with a hot-water supply, preheating or air-conditioning system.

However, the deposition or solidification of salts does not always proceed readily. That is to say, in the former case, a salt often dissolves in amounts more than its solubility at that temperature. Namely, a supersaturated solution is formed and therefor, the deposition does not effectively proceed. In the latter case, the phase transition of a salt from the molten state to the solid state does not occur, even below the transition temperature on cooling. Thus, the salt forms supercooled molten liquid. The supersaturated solution requires a long time and an extra cooling to deposit a salt. The supercooled state makes the supersaturated solution is unusable in an air-conditioning system because latent heat is not released. Agitation of a system or addition of seed crystals to a system have been adopted to prevent the system from supercooling or supersaturation, but their effect is not always sufficient.

It is an object of the present invention to provide a novel process for depositing a salt in a good efficiency from an aqueous solution or molten liquid of the salt.

A further object of the invention is to provide a process for depositing a salt in a simple manner from an aqueous solution or molten liquid of the salt.

Another object of the invention is to provide a process for the prevention of the supersaturation of an aqueous solution of a salt or the supercooling of a molten liquid of a salt.

These and other objects of the present invention will become apparent from the description hereinafter.

SUMMARY OF THE INVENTION

In accordance with the present invention, there is provided a process for depositing a salt which comprises arranging at least one pair of electrodes in a supersaturated aqueous solution or supercooled molten liquid of an inorganic or organic salt, and applying an electric current or voltage to the electrodes.

BRIEF DESCRIPTION OF THE DRAWINGS

FIG. 1 is a schematic diagram showing an air-conditioning system which utilizes the process of the present invention:

FIG. 2 is a schematic diagram showing another air-conditioning system provided with an automatic controlling mechanism for application of a voltage: and FIGS. 3 to 8 are schematic perspective views showing the shapes of containers to charge salts as heat-storage materials in an air-conditioning system which utilizes the process of the present invention.

DETAILED DESCRITPION

According to the present invention, a very simple apparatus can be used, which requires arranging at least one pair of electrodes in an aqueous solution or molten liquid of a salt. Moreover, the supersaturated or supercooled state of the salt solution is broken and the salt can be deposited by a simple means such as application of a voltage. Therefore, the process of the present invention is very available for industrial use, and for example, can be advantageously applied to a heat-storage system.

Although the mechanism of the phenomena is not clear, it is considered that an electric current changes the characteristic of the electrode surface or the solution or liquid to cause nucleation, whereby the supercooled state or the supersaturated state is broken.

The term "supersaturated aqueous solution of a salt" as used herein means an aqueous solution of a salt which is dissolved in an amount more than that defined by the solubility at a prescribed temperature. The term "supercooled molten liquid of a salt" as used herein means a molten liquid of a salt which remains in the molten state even at a temperature lower than the solidifying point of the salt.

When at least one pair of electrodes are provided in a supersaturated aqueous solution or supercooled molten liquid of a salt and a voltage is applied between the electrodes, deposition of the salt occurs. The voltage is applied to a pair of the electrodes through a circuit connected to an electric source. After the deposition of a salt, the electric source is turned off. In some combination of the electrodes used, that is, in case that the electrodes consist of metals having a different ionization tendency, it is not always required that they be connect the electric source. The object can be attained by merely making a closed-circuit between the electrodes, since a Galvanic cell is formed to spontaneously generate a voltage. In that case, when the circuit is always closed, exhaustion of the electrodes is noticeable. Accordingly, it is advantageous to form a open-circuit between the electrodes when the application of a voltage is not required.

Although the materials of an electrode are not particularly limited, those having a large hydrogen overvoltage are preferred. Examples of the material of the electrode which can be used in the present invention are amorphous carbon, artificial graphite, copper silicide, lead, lead-antimony alloy, lead-silver alloy. iron, iron-silicon alloy, fused magnetite, platinum, silver, aluminum, copper, zinc, antimony, tin, mercury, various amalgams, chromium, cadmium, and the like. Particularly. amalgam electrodes are practical, and copper amalgam and amalgams of copper alloys, e.g. alloys of copper with at least one of metals such as iron, zinc. tin.

nickel, manganese, chromium, aluminum, molybdenum and antimony, are effectively employed.

At least one pair of electrodes are provided at a suitable position in a tank, container or vessel for accommodating an organic or inorganic salt. The tank, container or vessel itself may form one or both of the electrodes. In all cases, it is necessary that the electrodes come in contact with the salt. In one pair of the electrodes, the material or the shape thereof may be the same or different.

In order to prevent the exhaustion of the electrode, it is advantageous to cover the surface thereof with a polymer. A manner for covering the electrode is not particularly limited, and any known manners are adoptable, including a manner in which an electrode is immersed in a solution of a polymer and, if necessary, further heat-treated for drying to form a covering layer on the surface of the electrode, a manner in which a solution of a polymer is sprayed onto the surface of the electrode, and a manner in which a film or filaments of a polymer are closely adhered onto the surface of the electrode.

Any of hydrophilic polymers and hydrophobic polymers can be employed as covering or coating materials.

The hydrophilic polymers used in the present invention are those having hydrophilic groups such as hydroxyl group, carboxyl group, amido group and so on. Examples of the hydrophilic polymers are partially or completely hydrolyzed polyvinyl alcohols: formalized, acetalized, butyralized or urethanated polyvinyl alcohols: esterification products of polyvinyl alcohols with acetoacetic acid, sulfonic acids or carboxylic acids: hydrolyzed copolymers of a vinyl esters with other monomers copolymerizable therewith, e.g. an olefin such as ethylene, propylene. isobutylene, α-octene, α-dodecene or α-octadecene, an unsaturated carboxylic acid such as acrylic acid, methacrylic acid, crotonic acid, maleic acid, maleic anhydride or itaconic acid, a salt or monoalkyl or dialkyl ester of the unsaturated carboxylic acid, a nitrile compound such as acrylonitrile or methacrylonitrile, an amido compound such as acrylamide or methacrylamido, an olefin sulfonic acid or its salt such as ethylene sulfonic acid, allyl sulfonic acid or methallyl sulfonic acid, an alkyl vinyl ether, a vinyl ketone, N-vinyl pyrrolidone, vinyl chloride, and vinylidene chloride; cellulose derivatives such as methyl cellulose, ethyl cellulose, hydroxymethyl cellulose, hydroxypropyl cellulose, hydroxybutylmethyl cellulose, hydroxyethyl cellulose, carboxymethyl cellulose, aminomethylhydroxypropyl cellulose and aminoethylhydroxypropyl cellulose; starches; tragacanth; pectin; glue; alginic acid or its salts; gelatin: polyvinyl pyrrolidone; polyacrylic acid or its salts and polymethacrylic acid or its salts; polyacrylamide and polymethacrylamide: copolymers of vinyl acetate with an unsaturated carboxylic acid such as maleic acid, maleic anhydride, acrylic acid, methacrylic acid, itaconic acid, fumalic acid or crotonic acid, copolymers of styrene with the above unsaturated carboxylic acid, copolymers of a vinyl ether with the above unsaturated carboxylic acid, salts and esters of the above copolymers: and the like. These hydrophilic polymers may be post-treated or admixed with a suitable material such as water proofing agent, crosslinking agent, gelling agent, thickner, plasticizer or film forming aid.

Examples of the hydrophobic polymers used in the present invention are, for instance, homopolymers or copolymers of olefins such as polyethylene and polypropylene, homopolymer or copolymers of styrene, homopolymer or copolymers of vinyl acetate, homopolymers or copolymers of acrylic or methacrylic acid esters, homopolymers or copolymers of vinyl or vinylidene chlorides, homopolymers or copolymers of acrylonitrile or methacrylonitrile, homopolymers or copolymers of vinyl ethers, poly-p-xylene, fluorine-containing polymers, polycarbonates, polyesters, polyamides, diene polymers, urethane resins, urea resins, melamine resins, phenol resins, furan resins, alkyd resins, unsaturated polyester resins, epoxy resins, and the like.

When an aqueous solution or molten liquid of a salt has reached the supersaturated or supercooled state, a voltage of 1 $\mu V$ to 10 V, preferably 0.2 V to 3 V is applied for about 1 nanosecond to about 300 seconds. In case of using an electric source, any of direct current, alternating current (low-frequency and high-frequency) and pulse are usable.

The process of the present invention is applicable to organic salts and inorganic salts. Examples of the salts are, organic salts, e.g. metal salts of carboxylic acids such as acetic acid. propionic acid, isovaleric acid, butyric acid, succinic acid, maleic acid, malic acid, tartaric acid, benzoic acid, salicylic acid, nicotinic acid and sorbic acid, and metal salts of amino acids such as serine, threonine and aspartic acid. and inorganic salts, e.g. calcium chloride, sodium sulfate, sodium carbonate, sodium hydrogenphosphate, calcium nitrate, sodium thiosulfate, magnesium nitrate, ammonium alum, magnesium chloride, potassium nitrate, lithium nitrate, potassium dichromate, calcium dichromate, plutonium phosphate and plutonium nitrate.

The process of the present invention is very advantageously applied to heat-storage systems utilizing solar heat in which inorganic or organic salts, especially their hydrates, are availably employed as materials for heat-storage because of large heat capacity.

FIG. 1 shows a simple air-conditioning system utilizing the process of the invention. In container 1, inorganic or organic salt is deposited from a molten liquid of a salt formed by utilizing solar heat or waste heat, and a latent heat released is utilized for air-conditioning. Numeral 2 is a pair of electrodes, and they are connected with an electric source 3 and a switch 4. Numeral 5 is a heat exchanger which is a spiral copper pipe, and water charged in a water tank 6 is circulated by a pump P through heat exchanger 5, water tank 6 and radiator 7. The circulating water flow is changed by a cock 8.

In the daytime, water heated by solar heat in tank 6 is sent out to container 1 through a pipe, and a material for heat-storage (inorganic or organic salt) in the container 1 is melted by water passing through heat exchanger 5 to store heat. The heat-exchanged water is circulated back to the water tank 6, and after heated, is again introduced into the container 1. In the night, cock 8 is turned so that the circulating water flows through radiator 7. The heat of molten liquid in the container 1 is transferred to the circulating water through the heat exchanger 5, and the heat from the radiator 5 is used for air conditioning. The heat radiation proceeds. When the temperature of the salt goes down below its solidifying point and slight supercooling is observed, a voltage is applied to the electrodes 2 by turning on the switch 4. Several seconds after, the supercooling is broken and the latent heat is released, which is supplied to the circulating water successively.

The air-conditioning system as mentioned above may be more practically provided with attachments such as a temperature detecting device and a voltage regulator for controlling the voltage applied.

FIG. 2 shows another embodiment of the air-conditioning system in which the application of voltage is automatically controlled. Confirmed deposition of the salt is automatically performed by setting a temperature sensor 10 and a means 9 for automatically controlling the application of a voltage. A circuit is automatically closed at 4 to apply a voltage when the temperature sensor 10 detects a supercooling temperature. Thereafter, the circuit is opened again when the supercooling is broken and the temperature rises slightly, e.g. by about 1° to about 5° C. It is not always necessary to provide the temperature sensor 10 in the container, and the sensor may be provided at any location so far as the supercooling of the salt in the container 1 can be detected, e.g. in a circulating water or a heat exchanger. Also, a means 9 can be controlled by a time switch so that a voltage is applied at a predetermined time for a predetermined period.

The air-conditioning system will be explained again by reference to FIG. 2. Water heated by solar heat in tank 6 is sent out to container 1 through a pipe, and a salt in the container 1 is melted by water passing through heat exchanger 5. The heat-exchanged water is circulated to the water tank 6, and the water is again heated and sent out to the container 1. In the night, the ciuculating water is passed through a radiator 7 by operating a cock 8, whereby the molten salt begins to radiate heat. The circulating water is heated through the heat exchanger 5, and the heat through the radiator 5 is used for air-conditioning. When a temperature sensor 10 detects the supercooling, a signal is transmitted to a controlling device 9, and the a voltage is applied to electrodes 2 by closing the circuit at switch 4. Several seconds after, the supercooling is broken and the deposition of the salt begins. Thus, the circulating water is successively heated with the latent heat. The application of a voltage is automatically stopped by turning off the switch 4 when the temperature sensor 10 detects the rise of an inner temperature of the container 1.

Organic or inorganic salts used as materials for heat-storage are suitably selected according to the desired temperature range. For instance, calcium chloride hexahydrate, sodium sulfate decahydrate, sodium carbonate decahydrate, disodium hydrogenphosphate undecahydrate, calcium nitrate tetrahydrate, sodium thiosulfate pentahydrate and sodium acetate trihydrate are employed for a temperature range of 30° to 60° C. Also, magnesium nitrate hexahydrate, potassium alum (dodecahydrate), ammonium alum (dodecahydrate), magnesium chloride hexahydrate, combination of potassium nitrate and lithium nitrate and combination of potassium nitrate, lithium nitrate and sodium nitrate are employed for a temperature range of 80° to 120° C.

The shapes of the container are not particularly limited. and the container may be in any shapes. e.g. cube. rectangle, sphere, pipe, sausage-like shape and panel as shown in FIGS. 3 to 8. Plastics, metals, carbon materials, glass, concrete, brick and the like are employed as a material of the container.

Usually a plurality of the containers are employed by arrangement in series or in a row. Of course, a single container may be employed.

The supercooling can be more efficiently prevented by incorporating a nucleating aid into a material for heat-storage. Examples of the compounds used as a nucleating aid are ferric acetate, ferrous chloride, ferric chloride, other iron salts such as ferric citrate, ferrous lactate, ferrous phosphate, ferric perchlorate and ferric nitrate, anhydrous calcium chloride, calcium chloride monohydrate, calcium chloride dihydrate, calcium bromide dihydrate, cupric chloride dihydrate, and the like. These nucleating aids may be employed alone or in admixture thereof. The amount of the nucleating aid is selected from 1 to 50.000 p.p.m., preferable 10 to 2,000 p.p.m. based on the salt used as heat-storage materials.

It is also possible to employ an agent for the purpose of stabilizing the molten liquid or adjusting the melting point of a salt. Examples of the agent are formic acid, acetic acid, propionic acid, n-butyric acid, isobutyric acid, valeric acid, oxalic acid, malonic acid, succinic acid, fumaric acid, α-tartaric acid, citric acid, dl-malic acid, acrylic acid, glyoxylic acid, glycolic acid, monochloroacetic acid, dichloroacetic acid, glycine, ammonium citrate, lithium sulfate, magnesium sulfate, magnesium chloride, manganese nitrate, ammonium chloride, ammonium nitrate, ammonium carbonate, ammonium dihydrogenphosphate, sodium formate, ammonium formate, potassium formate, copper formate, manganese formate, calcium formate, calcium nitrate, calcium acetate, calcium chloride, calcium bromide, calcium iodide. These stabilizing agents may be employed alone or in admixture thereof. The amount of the stabilizing agent is usually selected from 0.1 to 20% by weight based on the salt used as heat-storage materials.

The present invention is more specifically described and explained by means of the following Examples in which all % are by weight unless otherwise noted. It is to be understood that the present invention is not limited to the Examples and various changes and modifications may be made in the invention without departing from the spirit and scope thereof.

EXAMPLE 1

A vessel provided with a pair of copper amalgam electrodes was charged with a 41% aqueous solution of sodium sulfate, and the solution was slowly cooled to 20° C., but no formation of crystals was observed, though the solution was in the supersaturated state. A direct current of 2.5 V was applied to the electrodes for 23 seconds, and crystal growth was observed. The temperature was kept at 20° C. to avoid the rise of the inside temperature due to the latent heat release, and 92% of the sodium sulfate decahydrate which was contained in the solution deposited after 12 minutes.

EXAMPLE 2

The procedure of Example 1 was repeated except that nickel and zirconium electrodes were employed instead of the copper amalgam electrodes, to give approximately the same result.

EXAMPLE 3

The procedure of Example 1 was repeated except that an alternating current of 3 V and 60 Hz was applied instead of the direct current, to give approximately the same result.

EXAMPLE 4

A vessel provided with a pair of copper amalgam electrodes was charged with calcium nitrate tetrahydrate, and it was molten at 50° C. When the inside temperature dropped to 39° C. and the salt formed the supercooled liquid, a square-wave alternating current of 2.5 V (10 Hz) was applied to the electrodes. The salt was deposited after 30 seconds application of the voltage and rise of the inner temperature was observed. Crystal growth proceeded and the whole molten liquid was solidified.

EXAMPLE 5

A vessel provided with a pair of phosphor bronze amalgam electrodes was charged with 200 g. of water and 8.0 g. of potassium dl-tartarate, and the salt was dissolved at 80° C. After cooling the solution to 20° C., a square-wave alternating current (2.3 V, 0.3 Hz) was applied for 70 seconds to start the formation of crystals. The solution was kept at the same temperature and finally 6.8 g. of crystals was obtained.

EXAMPLE 6

A vessel provided with a pair of silver and tin electrodes was charged with 64 g. of potassium sorbate and 36 g. of water, and the mixture was melted at 93° C. The solution was cooled to 40° C., and an alternating current (60 Hz, 2 V) was applied for 1 minute. The solution was further cooled to 20° C. and 8 g. of crystalline potassium sorbate was collected.

EXAMPLE 7

A test tube having an inner diameter of 5 cm. was charged with sodium acetate trihydrate, and thereto was added a slight amount of liquid paraffin in order to prevent evaporation of water. A pair of copper amalgam electrodes were inserted from the top of the tube to come into contact with the content.

After having been melted at 80° C., sodium acetate trihydrate was cooled. When the inner temperature dropped to 50° C., a direct current of 1.6 V was applied to the electrodes. Sodium acetate trihydrate began to deposit as crystals after 10 seconds application of the voltage and the inner temperature rose to 58° C.

If no voltage is applied, the supercooling state continued to a temperature of 25° to 30° C.

EXAMPLE 8

The procedure of Example 7 was repeated except that a pair of molybdenum and copper amalgam electrodes were employed, to give approximately the same result.

EXAMPLE 9

The procedure of Example 7 was repeated except that an alternating current (1.2 V, 60 Hz) was applied instead of the direct current. Deposition of the salt occurred after 3 seconds application of the voltage.

EXAMPLE 10

A test tube having an inner diameter of 5 cm. was charged with 60 g. of calcium chloride hexahydrate and 5 g. of liquid paraffin, and the salt was dissolved at 50° C. A pair of brass amalgam electrodes were inserted to the molten liquid, and the liquid was kept at 50° C. for 2 hours. The temperature was dropped at a rate of 0.3° C./min., and when it reached 23° C., an alternating current (0.8 V, 100 Hz) was applied to the electrodes. After 37 seconds, deposition of crystals was observed and the inner temperature rose to 29° C.

EXAMPLE 11

A test tube having an inner diameter of 5 cm. was charged with sodium acetate trihydrate and liquid paraffin as an agent for preventing evaporation of water. A pair of copper amalgan electrodes and a thermometer were provided at the upper portion of the tube so that they came into contact with the contents therein.

The temperature sensor was connected with an automatic controlling device for application of a voltage which was assembled in the circuit connecting the electrodes. The automatic controlling device was set so that when the inside temperature of the tube reached 51° C., the circuit was closed to apply a voltage of 1.7 V (alternating current of 60 Hz) between the electrodes, and when the temperature reached 52° C., the circuit was opened to stop the application of voltage.

First, the test tube was heated at 80° C. to melt sodium acetate trihydrate. The molten liquid was then allowed to cool, and when the inner temperature dropped to 51° C. (supercooling state), a voltage was automatically applied. After 10 seconds application, crystalline sodium acetate trihydrate began to deposite and rise of the temperature was observed. When the inner temperature reached 52° C., the application of voltage was automatically stopped. Thereafter, the temperature rose to 58° C.

EXAMPLE 12

The procedure of Example 11 was repeated except that a pair of iron and copper amalgam electrodes were employed, to give approximately the same result.

EXAMPLE 13

The procedure of Example 11 was repeated except that a square-wave alternating current (3 V, 15 Hz) was applied. Crystals began to deposit after 3 seconds application of the voltage.

EXAMPLE 14

Rod-like copper amalgam electrodes having a diameter of 2 mm. and a length of 10 cm. were immersed in a 20% aqueous solution of polyvinyl alcohol having a degree of polymerization of 2,000 and an average degree of hydrolysis of 99% by mole. The electrodes were then taken out and air-dried, thus electrodes covered with polyvinyl alcohol were obtained.

A test tube having an inner diameter of 5 cm. was charged with sodium acetate trihydrate and a slight amount of liquid paraffin. A pair of the above electrodes were inserted into the contents from the top of the test tube. After having been molten at 80° C., sodium acetate trihydrate was allowed to cool and when the inner temperature dropped to 50° C., a voltage of 2.4 V (alternating current of 60 Hz) was applied to the electrodes. After the application of voltage for 2 to 3 minutes, sodium acetate trihydrate began to deposit, and the inner temperature rose to 58° C.

Thereafter, heat cycle between 48° C. and 75° C. was repeated more than 300 times, but deterioration in quality (coloration, decrease of heat generation) of sodium acetate trihydrate and deterioration of the electrodes were not observed.

EXAMPLES 15 to 17

The procedure of Example 14 was repeated except that the covering of the electrodes were conducted by employing a 14% aqueous solution of polyvinyl alcohol having a degree of polymerization of 1,800 and an average degree of hydrolysis of 88% by mole (Example 15), a 16% aqueous solution of polyvinyl alcohol modified with monomethyl maleate having a monomethyl maleate content of 2% by mole and an average degree of hydrolysis of 99% by mole (Example 16), or a 20% aqueous solution of polyvinyl alcohol modified with sodium allyl sulfonate having a sodium allyl sulfonate content of 1.5% by mole and an average degree of hydrolysis of 90% by mole (Example 17), and an alternating current of 1 V was applied. In all cases, sodium acetate trihydrate began to deposit after 1 minute application of voltage. Also, the heat cycle was repeated more than 300 times, but exhaustion of the electrodes was not observed.

EXAMPLE 18

Electrodes covered with a film of a hydrophobic polymer having a thickness of 6.4 μm. was made by immersing rod-like copper amalgam electrodes having a diameter of 2 mm. and a length of 10 cm. in a 10% toluene solution of a copolymer of methyl methacrylate and n-butyl methacrylate in a weight ratio of 6:4, taking the electrodes out and drying them.

A test tube having an inner diameter of 5 cm. was charged with sodium acetate trihydrate and a slight amount of liquid paraffin as an agent for preventing the evaporation of water. A pair of the above electrodes were inserted into the content from the top of the test tube so as to come into contact with the content.

Sodium acetate trihydrate was molten at 80° C., and it was allowed to cool. When the inner temperature dropped to 50° C., a voltage of 2.4 V (alternating current of 60 Hz) was applied to the electrodes. After 7 seconds, crystalline sodium acetate trihydrate began to deposit, and the inner temperature rose to 58° C.

Thereafter, heat cycle between 45° C. and 80° C. was repeated more than 300 times, but deterioration in quality (coloration, decrease of heat generation) of sodium acetate trihydrate and deterioration of the electrodes were not observed.

EXAMPLES 19 to 26

The procedure of Example 18 was repeated except that the electrodes covered with films of the hydrophobic polymers shown in Table 1 were employed.

The results are shown in Table 1.

TABLE 1

| Ex. No. | Electrode Hydrophobic polymer | Film thickness (μm.) | Time up to crystal formation (second) | Number of heat cycles |
|---|---|---|---|---|
| 19 | Methyl methacrylate/n-butyl methacrylate copolymer (6/4 by weight) | 11 | 63 | 300 |
| 20 | Methyl methacrylate/n-butyl methacrylate copolymer (6/4 by weight) | 28 | 56 | 300 |
| 21 | Methyl methacrylate/n-butyl methacrylate copolymer (6/4 by weight) | 84 | 135 | 300 |
| 22 | Styrene/n-butyl acrylate copolymer (7/3 by weight) | 4.8 | 15 | 300 |
| 23 | Styrene/n-butyl acrylate copolymer (7/3 by weight) | 55 | 70 | 300 |
| 24 | Vinyl acetate/methyl methacrylate/n-butyl acrylate copolymer (4.5/5.5/0.5 by weight) | 3.1 | 4 | 300 |
| 25 | Vinyl acetate/methyl methacrylate/n-butyl acrylate copolymer (4.5/5.5/0.5 by weight) | 21 | 100 | 300 |
| 26 | Vinyl acetate/methyl methacrylate/n-butyl acrylate copolymer (4.5/5.5/0.5 by weight) | 153 | 153 | 300 |

TABLE 1-continued

| Ex. No. | Electrode Hydrophobic polymer | Film thickness (μm.) | Time up to crystal formation (second) | Number of heat cycles |
|---|---|---|---|---|

EXAMPLE 27

A test tube having an inner diameter of 5 cm. was charged with sodium acetate trihydrate and a slight amount of liquid paraffin. The salt was molten at 75° C., and a pair of copper amalgam and zinc electrodes were inserted into the molten liquid. The molten liquid was allowed to cool, and when the inner temperature dropped to 50° C., the both electrodes were short-circuited with an external circuit. After 3 seconds, crystalline sodium acetate trihydrate began to deposit and the inner temperature rose to 58° C. In this test, the voltage between the electrodes was 0.58 to 0.67 V at 45° C.

EXAMPLE 28

The procedure of Example 27 was repeated except that tin electrode was employed instead of the zinc electrode, to give approximately the same result. The voltage between the electrodes at 45° C. was 0.94 to 1.05 V.

EXAMPLE 29

The procedure of Example 27 was repeated except that titanium electrode was employed instead of the zinc electrode, to give approximately the same result. The voltage between the electrodes at 47° C. was 0.05 to 0.1 V.

EXAMPLE 30

The procedure of Example 27 was repeated except that the both electrodes short-circuited with an external circuit were inserted into the molten liquid and the heat cycle between 80° C. and 45° C. was repeated more than 80 times. Crystals deposited at about 53° C. in every heat cycle.

EXAMPLE 31

The procedure of Example 30 was repeated except that a pair of zinc amalgam and copper electrodes were employed, to give approximately the same results. The voltage between the electrodes at 46° C. was 1.1 to 1.4 V.

EXAMPLE 32

A test tube having an inner diameter of 3 cm. was charged with calcium chloride hexahydrate and a slight amount of liquid paraffin. The salt was molten at 50° C., and after inserting a pair of copper amalgam and zinc electrodes into the molten liquid, it was allowed to cool. When the inner temperature dropped to 20° C., the both electrodes were short-circuited with an external circuit. After 27 seconds, calcium chloride hexahydrate began to deposit, and the inner temperature rose to 29° C. The voltage between the electrodes at 34° C. was 0.9 to 1.2 V.

What we claim is:
1. A process for depositing a salt in a heat-storage system, which comprises cooling a suitable inorganic or organic metal salt solution or molten liquid thereof between at least one pair of electrodes, automatically sensing the formation of a supersaturated aqueous solution or supercooled molten liquid, and then applying a voltage of 1 μV to 10 V across the electrodes for about 1 nanosecond to about 300 seconds, thereby initiating the deposition of the salt.

2. The process as defined in claim 1, wherein the electrodes are amalgam electrodes.

3. The process as defined in claim 2, wherein the electrodes have a suitable covering layer thereon.

4. The process as defined in claim 1, wherein the supersaturated aqueous solution or supercooled molten liquid has a suitable nucleating aid therein in an amount from 1 to 50,000 ppm based on the inorganic or organic metal salt.

5. The process as defined in claim 1, wherein the supersaturated aqueous solution or supercooled molten liquid has a suitable stabilizing agent therein in an amount of 1.0 to 20% by weight based on the inorganic or organic metal salt.

6. A process of conditioning air, which comprises cooling a suitable inorganic or organic metal salt solution or molten liquid thereof between at least one pair of electrodes, by contacting the solution or liquid with a colder heat-exchange medium, thereby heating the medium; while automatically sensing for the formation of a supersaturated aqueous solution or supercooled molten liquid, and then applying a voltage of 1 μV to 10 V across the electrodes for about 1 nanosecond to about 300 seconds, thereby initiating the deposition of the salt and further releasing heat to the medium, and using the heated medium to condition air.

7. The process as claimed in claim 6, wherein the heat-exchange medium is water, and the heating of the water is obtained by passing the water through a heat exchanger located within the inorganic or organic metal salt solution or molten liquid thereof.

* * * * *